Sept. 18, 1962 G. W. BATES ETAL 3,054,949
METHOD OF AND APPARATUS FOR IDENTIFYING DISCRETE TIP AND RING CONDUCTOR PAIRS IN TELEPHONE CABLE
Filed Dec. 2, 1958 3 Sheets-Sheet 1

INVENTORS: G. W. BATES
R. F. CLARK
BY Patrick J. Roche
ATTORNEY

INVENTORS: G. W. BATES
R. F. CLARK
BY Patrick J. Roche
ATTORNEY

Sept. 18, 1962 G. W. BATES ETAL 3,054,949

METHOD OF AND APPARATUS FOR IDENTIFYING DISCRETE TIP AND RING CONDUCTOR PAIRS IN TELEPHONE CABLE

Filed Dec. 2, 1958 3 Sheets-Sheet 3

INVENTORS: G. W. BATES
R. F. CLARK
BY Patrick J. Roche
ATTORNEY 3,054,949

METHOD OF AND APPARATUS FOR IDENTIFYING DISCRETE TIP AND RING CONDUCTOR PAIRS IN TELEPHONE CABLE

George W. Bates, Nashville, Tenn., and Robert F. Clark, Atlanta, Ga., assignors to American Telephone and Telegraph Company, a corporation of New York
Filed Dec. 2, 1958, Ser. No. 777,724
4 Claims. (Cl. 324—66)

This invention relates to a method of and apparatus for identifying individual conductors in a multiconductor telephone cable, and more specifically to a method of and apparatus for identifying discrete pairs of tip and ring conductors at the opposite ends of such cable, or at intermediate points therealong.

Cables comprising a plurality of twisted pairs, each including a tip and ring conductor, enclosed in a lead sheath are well-known in telephony communication. These cables may constitute individual links between a telephone central office and a plurality of telephone subscribers positioned remotely therefrom in the same geographical area. Also, the cables may be spliced in tandem to constitute a continuously long cable in which the twisted pairs of one cable are joined to the twisted pairs of each succeeding cable section. In either event, it is imperative that the discrete tip and ring conductor pairs at the opposite terminals of the cable be connected to previously assigned equipments located thereat. To achieve this, it is necessary to employ suitable testing apparatus to ensure that the tip and ring conductors of each twisted pair are properly identified and correspond at the opposite cable terminals.

In one identification system of the above type known heretofore, it was necessary to pierce the conductor insulation at least once at each of several intermediate points on the individual conductors in order to provide a metallic connection thereof with direct-current testing equipment. It was found that damage to the insulation tended eventually to cause deterioration of the metallic conductors due to leakage of direct current, particularly in high-humidity areas. It was also found that such piercing of the conductor insulation tended to impair the initially established high-dielectric characteristic of the conductor insulation, whereby intolerable levels of noise tended to occur. A system of the foregoing type is substantially disclosed in Meldal Patent No. 2,666,898, issued January 19, 1954, and Murphy Patent No. 2,822,519, issued February 4, 1958.

In another known system an alternating-current signaling tone was applied successively to a plurality of individual conductor pairs on a basis of one-pair-at-a-time at the sending end, and the signaling tone picked up with the aid of a suitable probe and amplifier at one or more intermediate points and/or at the receiving end. Normally, this procedure involves the use of two technicians, one at the sending end to transfer the signaling tone successively from one conductor to another, and a second one at the intermediate point or conductor end to manipulate the testing equipment. A system of this type is disclosed in Fisher-Parker Patent No. 2,133,384, issued October 18, 1938.

An alternating-current signaling tone system permitting a one-man testing operation is also known. This involves the use of an automatic selecting device operated by a technician located at a remote point for actuating a switching mechanism at a telephone central office to place the alternating-current signaling tone on the sending end of one preselected conductor pair at the central office at a given time. This system also permits the use of a pick-up probe and amplifier by the technician at the testing location on the conductor. Although this system involves essentially a one-man operation, it further involves the use of equipment which is relatively expensive, heavy and bulky, intended basically for use with switching mechanisms located permanently in central office and tending to manifest mechanical difficulties from time to time thereby requiring maintenance, and requires the use of technicians of certain skill. Such testing equipment is disclosed in Lowman et al. Patent No. 2,799,739, issued July 16, 1957, and Meanley Patent No. 2,806,995, issued September 17, 1957.

The present invention contemplates apparatus for expeditiously identifying discrete tip and ring conductor pairs at spaced points on a multiconductor telephone cable on a one-man basis with the aid of simple and facile testing equipment.

The main object of the invention is to enable one technician to identify expeditiously the tip and ring conductors of a plurality of discrete conductor pairs and to number such pairs at spaced points on a multiconductor telephone cable.

It is another object to provide conductor identification equipment which is inertialess.

It is a further object to provide conductor identification equipment which substantially obviates the use of mechanically moving parts.

It is another object to provide conductor identification equipment which is entirely portable and capable of expeditious use by one technician, although it is divided between two geographically spaced points in a given telephone area.

It is another object to provide conductor identification equipment involving substantially minimum cost.

In association with a tagboard for arbitrarily identifying the tip and ring conductors of a plurality of discrete conductor pairs in a multiconductor telephone cable with preselectedly two-digital numbers and a multiterminal voltage-divider network having certain terminals connected to particular tip and ring conductors of preselected numbers in a predeterminedly numerical order at the sending end of the cable, and testing equipment including a probe, an amplifier-rectifier circuit, and an ohmmeter circuit located at the receiving end of the cable or at one or more intermediate points spaced therealong for picking up a testing tone from a particular tip or ring conductor under test at a given moment, the present invention comprises a suitable generator of alternating-current signaling tone connected across the outermost terminals of the voltage-divider network for simultaneously providing the signaling tone in all tip and ring conductors connected to the voltage-divider terminals with differently voltage magnitudes, that is, distinctively electrical quantities, depending upon the particular voltage-divider terminals to which specific tip and ring conductors are connected.

The different voltage magnitudes derived via the probe from the individual tip and ring conductors one-at-a-time at the identification point of the cable are translated by the amplifier-rectifier circuit into correspondingly differently voltage magnitudes. The translated voltages are then utilized by the ohmmeter circuit to identify the particular tip or ring conductor which had a voltage of comparable magnitude provided thereon at the sending end of the cable whereby the plurality of tip and ring conductor pairs at the identification point of the cable may be tagged with two-digital numbers corresponding to the two-digital numbers tagging the same tip and ring conductor pairs at the sending end of the cable.

One feature of the invention resides in the establishment of the differently voltage magnitudes simultaneously in all tip and ring conductors connected to the voltage-divider network at a given time. Another feature lies in the procedure that once the signaling-tone generator is connected across the voltage-divider network at the sending end of the cable under test, no further adjustment of the testing set-up thereat on the part of the technician is required. Still another feature relates to the facile portability of the over-all test equipment due to its minimum weight and bulk. A further feature involves the simplicity of design whereby certain components may be borrowed readily from available apparatus. An additional feature concerns the substantial minimization of both cost and maintenance which are occasioned by the obviation of mechanical movement and the use of standard components.

The invention will be more readily understood from the following description when taken together with the attached drawing in which.

Figure 1:
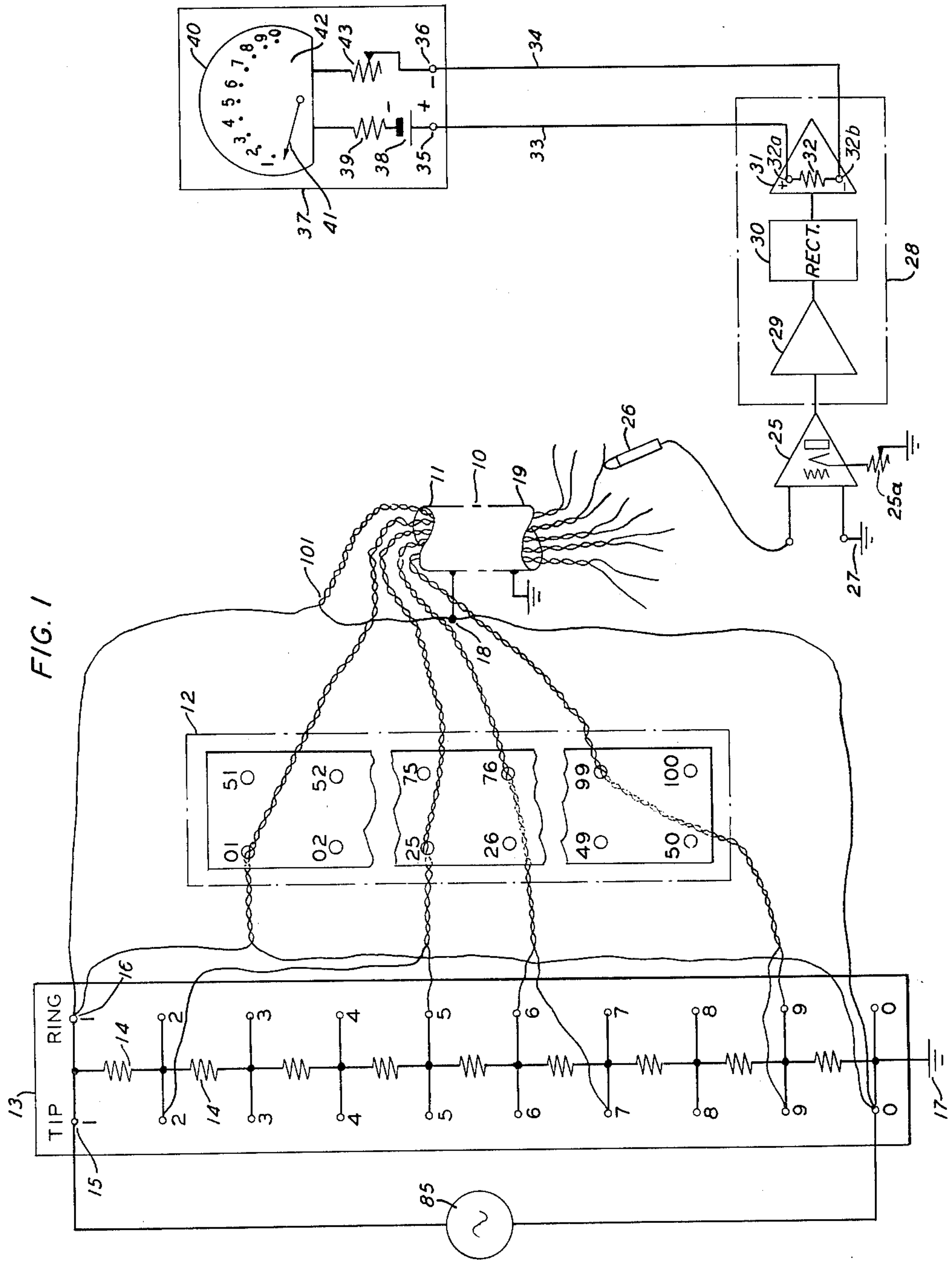
FIG. 1 is a schematic circuit illustrating a specific embodiment of the invention.

Referring to FIG. 1, a standard telephone cable 10, which is disconnected from a signaling circuit at the moment, comprises several hundred discrete pairs of tip and ring conductors twisted together throughout their entire length, each pair including one conductor having insulation provided with a distinctive color and the other conductor having plain or non-color insulation. Thus, for the purpose of this explanation, each pair will be hereinafter understood to include a plain or non-color conductor and a color conductor. This cable may have a length of the order of several hundred feet, or even to the order of several miles, and extend between two spaced points comprising the ends of a single section of cable wound on a reel, or several discrete cable sections spliced together to extend a distance of several miles, more or less, between two or more telephone central offices.

At cable end 11, or the sending end of the system in FIG. 1, a technician may project, for example, one hundred of the individual tip and ring conductor pairs through one hundred holes, respectively, provided in a conventional tagboard 12 and numbered from 01 through 100 thereby arbitrarily numbering such one hundred cable pairs from 01 through 100 in accordance with a well-known telephone procedure. It will be understood that the tagboard may include more or less holes depending on the number of twisted pairs to be identified in a given cable in a manner that will be presently explained. For the purpose of simplifying this explanation and the system of FIG. 1, it will be seen that certain pairs are projected only through holes 01, 25, 76 and 99 of the tagboard thereby arbitrarily assigning the respective numbers to those pairs at the cable end 11. It will be understood, although not shown for the purpose of clarity, that the remaining holes of the tagboard may be provided with discrete additional pairs in a similar manner thereby arbitrarily assigning the respectively remaining numbers in the tagboard to those pairs as further mentioned hereinafter.

A resistance network 13, constituting effectively a voltage divider in a manner and for a purpose that will subsequently appear, comprises nine resistors 14, 14, connected in series and having effective amounts of resistance determined in a manner that will be mentioned later. The opposite ends of each resistor are provided with two fixed terminals 15 and 16 which are identified thereon as terminal pairs 1, 1; 2, 2; 3, 3; 4, 4; 5, 5; 6, 6; 7, 7; 8, 8; 9, 9 and 0, 0. The top lefthand and righthand portions of the network above the terminals 1, 1 are given column designations Tip and Ring, respectively, for a purpose that will be presently indicated. Thus, each of the ten terminals of the Tip and Ring columns includes respectively ten terminals identified with individual single digits extending, from top to bottom, in the numerically ascending order and comprising 1, 2, 3, 4, 5, 6, 7, 8, 9 and 0, in accordance with conventionally telephone technique.

Recalling from the previous explanation that each tip and ring conductor pair includes a color conductor and a non-color conductor, all plain or non-color conductors in the cable are arbitrarily chosen as tip conductors and all color conductors as ring conductors. Referring now to FIG. 1, the technician at cable end 11 will connect the non-color conductor of pair 01 in the tagboard to tip terminal 0 and its associated color conductor to ring terminal 1, the non-color conductor of pair 25 to tip terminal 2 and its associated color conductor to ring terminal 5, the non-color conductor of pair 76 to tip terminal 7 and its associated color conductor to ring terminal 6, and the non-color conductor of pair 99 to tip terminal 9 and its associated color conductor to ring terminal 9. A tracer pair 101, one of several in the cable identified by a particularly distinctive color, has its non-color tip conductor connected to tip terminal 0 and its associated color ring conductor to ring terminal 1. Thus, it is seen that pair 01 and tracer pair 101 have their tip and ring conductors connected to the same tip and ring terminals 0 and 1, respectively, of the voltage-divider network.

Figure 2:
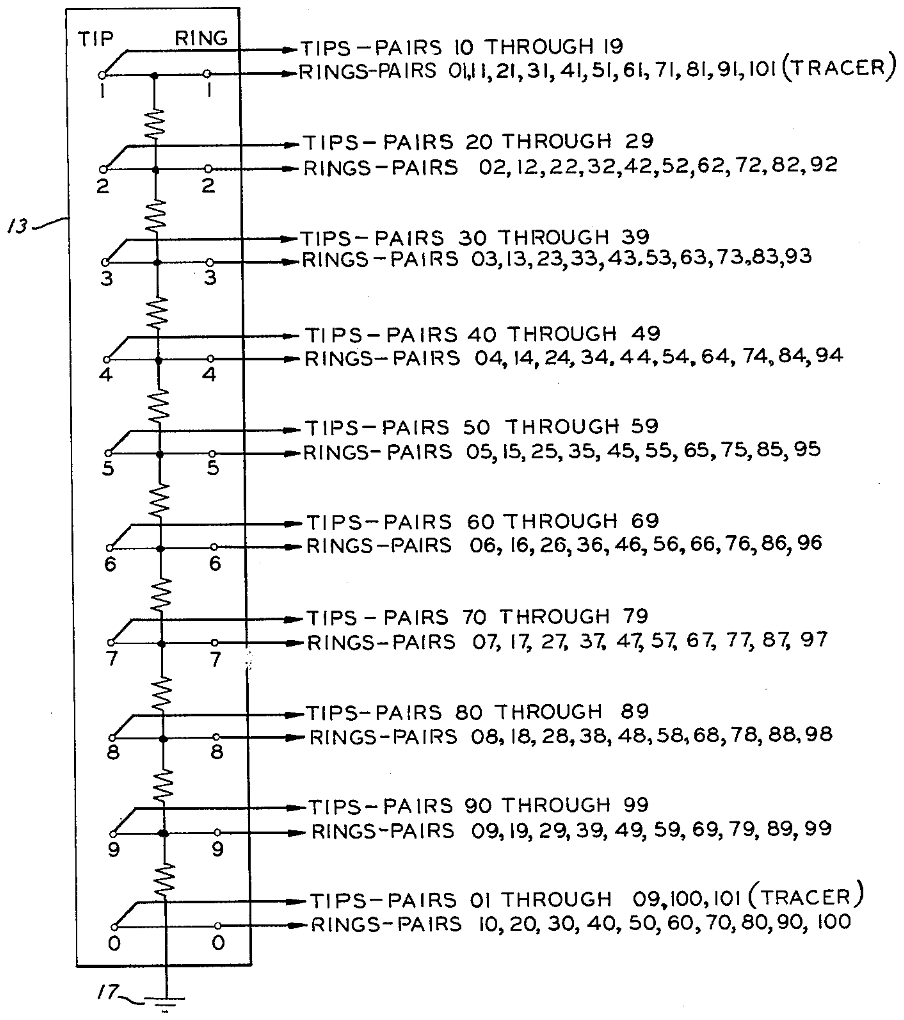
FIG. 2 is a diagram showing an arbitrarily numerical identification of a plurality of tip and ring conductor pairs at one end of the cable shown in the embodiment of FIG. 1.

In a similar manner, the technician may connect the tip and ring conductors of the individual pairs remaining in the tagboard to the respective tip and ring terminals 1 through 0 of the voltage-divider network. This will arbitrarily identify and number the first hundred twisted pairs in the ascendingly numerical order with the two-digital numbers of 01 through 100, as indicated in FIG. 2. Regarding pair 100, this will obviously comprise pair 00 with the prefixe of numeral "1" in accordance with conventionally telephone procedure. Here, it will be noted that while the tip and ring conductors of pair 01 and tracer pair 101, respectively, are connected to the terminals 0 and 1, respectively, of the resistance network as previously mentioned, the tracer pair 101 will be immediately recognized at all times by its distinctively different color.

Referring again to FIGS. 1 and 2, it will be seen that the tip and ring terminals 0, 0, of the resistance network are connected to ground 17; and the tip conductors of pair 01 and tracer pair 101 are also connected to the same ground. In addition, it will be noted that the tip conductor of tracer pair 101 at cable end 11 is also connected at point 18 to the grounded sheath of cable 10. Thus, the tip conductor of tracer pair 101 will constitute a ground return in the testing operation for identifying the one hundred cable pairs at the opposite cable end 19, in a manner that will be presently explained. It will be also seen from FIGS. 1 and 2 that once the technician has arbitrarily identified the hundred cable pairs 01 through 100 and tracer pair 101 at cable end 11, the task remains for him to identify the same cable pairs with correspondingly two-digital numbers at the opposite or receiving cable end 19. This completes the testing activity on the part of the technician at the sending cable end 11 shown in FIG. 1.

At cable end 19 in FIG. 1 there is assembled equipment for identifying thereat each of the one hundred pairs and the tracer pair that were identified arbitrarily numerically at cable end 11 in the manner just described. This equipment comprises an alternating-current amplifier 25 having a conventional design and including in its input a capacitive probe 26 and a ground 27. This probe may be of a type disclosed in the Fisher-Parker patent, or Meehan-Parker patent, or Lowman et al. patent, or Meanley et al. patent, supra. The output of the amplifier is connected to the input of a transistor-amplifier and rectifier circuit 28 which will be further described subsequently and which includes an alternating-current amplifier stage 29, a bridge-type varistor rectifier 30, and a direct-current amplifier stage 31. The latter stage includes in its output a resistor 32 which has its opposite ends connected via leads 33 and 34 to terminal posts 35 and 36 located in a meter unit 37 which may comprise a type disclosed broadly in the Meldal and Murphy patents, supra. In the meter unit, terminal post 35 is connected to a positive terminal of a direct-current source 38 whose negative terminal is connected through a fixed resistor 39 to a first side of a meter 40. This meter includes a movable pointer 41 and a dial 42 containing digits 1 through 0 arranged in an ascending order extending from the lefthand to the righthand and corresponding to the tip and ring rows of terminals 1 through 0 provided on the voltage-divider network as previously mentioned. A second side of meter 40 is connected through potentiometer 43 to terminal post 36. The equipment just described will be understood to comprise the receiving testing equipment.

Figure 3:
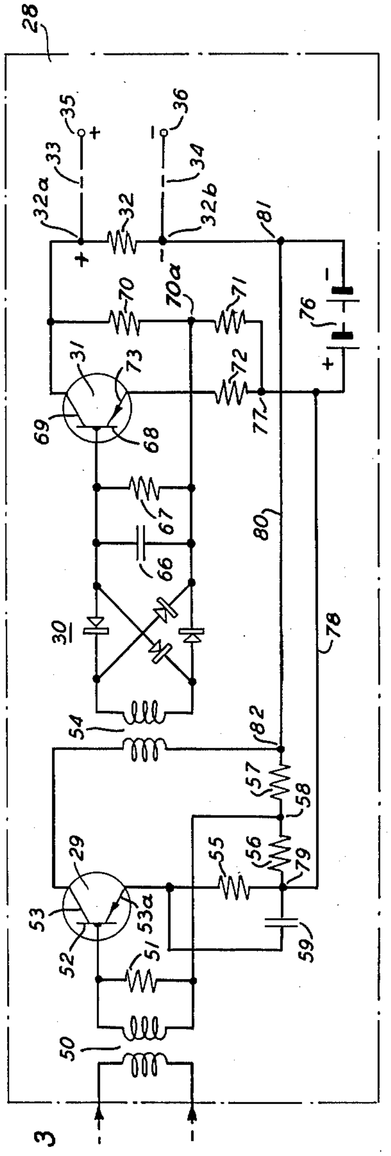
FIG. 3 is a schematic circuit of a transistor-amplifier and rectifier circuit included in FIG. 1.

The amplifier-rectifier circuit may comprise the circuit shown in FIG. 3 and includes a transformer 50 whose primary winding is connected to the output of alternating-current amplifier 25 in FIG. 1, and whose secondary winding is applied across resistor 51. One terminal of this resistor is connected to base electrode 52 of transistor stage 29 which has its collector electrode 53 connected to one side of a primary winding of transformer 54 and its emitter electrode 53*a* connected via series resistors 55, 56 and 57 to the other side of the primary winding of transformer 54. A second terminal of resistor 51 is connected to a common point 58 of voltage-divider resistors 56 and 57. A capacitor 59 shunts emitter-electrode resistor 55. Transistor stage 29 serves to amplify the alternating-current signal received from alternating-current amplifier 25 in the well-known manner.

Transformer 54 has its secondary winding connected across the input diagonal of the varistor bridge constituting rectifier 30 and having its output diagonal connected across capacitor 66 and resistor 67 in parallel. This rectifier bridge translates into rectified current the amplified alternating-current signal received from amplifier stage 29. One end of resistor 67 is connected to base electrode 68 of transistor stage 31 which has its collector electrode 69 connected to terminal 32*a* of output resistor 32. Voltage-divider series resistors 70, 71 and 72 have their opposite terminals connected across the collector and emitter electrodes 69 and 73, respectively, of transistor stage 31. Resistor 67 has its opposite end connected to a common point 70*a* of voltage-divider resistors 70 and 71. This transistor functions in a manner and for a purpose that will be subsequently mentioned and provides some gain for the rectified current received from rectifier 30. Output resistor 32 has its other terminal 32*b* connected to a negative terminal of a direct-current source 76 which has its positive terminal connected to common junction 77 of voltage-divider resistors 71 and 72 and via lead 78 to common junction 79 of voltage-divider resistors 55 and 56 and capacitor 59. Lead 80 connects a common junction 81 of resistor terminal 32*b* and the negative terminal of direct-current source 76 to a common junction 82 of the primary winding of transformer 54 and resistor 57. The terminals 32*a* and 32*b* of output resistor 32 are connected to the terminal posts 35 and 36 of the meter unit 37 via leads 33 and 34, respectively, as illustrated in FIGS. 1 and 3. Thus, it will be seen that the circuits involving transistor stages 29 and 31 comprise well-known types in which increases of base-electrode bias tends to produce proportionate amounts of collector current, and vice versa.

In one embodiment, the following apparatus in FIGS. 1 and 3 comprised the effective values as indicated:

| | |
|---|---|
| Transistors 29, 31 | RCA 2N104 RCA. |
| Resistor 32 | 2400 ohms. |
| Direct-current source 38 | 4.5 volts. |
| Resistor 39 | 500 ohms. |
| Potentiometer 43 | 5000 ohms. |
| Resistor 51 | 1000 ohms. |
| Transformer 54 | Ratio 600:600 ohms. |
| Resistor 55 | 3000 ohms. |
| Resistor 56 | 3000 ohms. |
| Resistor 57 | 6200 ohms. |
| Capacitors 59, 66 | 4 microfarads. |
| Resistor 67 | 3900 ohms. |
| Resistor 70 | 56,000 ohms. |
| Resistor 71 | 1200 ohms. |
| Resistor 72 | 510 ohms. |
| Direct-current source 76 | 9.0 volts. |

In accordance with the present invention, a generator 85 of an alternating-current signal of fixed and suitable frequency say, for example, 500 cycles per second, is connected across outermost terminals 1, 1 and 0, 0 of voltage-divider network 13 at the cable end 11 as shown in FIG. 1. The signaling generator, together with the resistance network and tagboard will be understood to constitute the transmitting equipment located at the sending end 11 of the cable. As a consequence, maximum signaling voltage is impressed between the voltage-divider terminals 1, 1 and 0, 0. Thus, in each of pair 01 and tracer pair 101 arbitrarily identified as above indicated, minimum (zero) voltage is simultaneously established between their tip conductors and ground, since both of these conductors are actually connected to ground which includes one output terminal of the signaling generator; whereas at the same time maximum voltage is also simultaneously established between their associated ring conductors and ground, since both of the latter conductors are actually connected to the other, or high-voltage, output terminal of the signaling generator. These two voltage conditions do not occur simultaneously for the tip and ring conductors of the remainder of the pairs connected to the voltage-divider network due to the voltage-divider action of the nine resistors connected in resistance network 13. As a consequence, tracer pair 101 may be used to calibrate the circuit of FIG. 1 in a manner that will be presently explained.

It will be apparent that the assignment of specific resistance values to the discrete series resistors constituting the voltage-divider resistance network 13 will depend upon the type of signaling voltage generator, amplifying equipment, and capacitive probe that are utilized in the system of FIG. 1. It will be evident, however, in FIG. 1 that predeterminedly different values of signaling voltage, that is, distinctively electrical quantities, are simultaneously established in all tip and ring conductors connected to the respective terminals of the voltage-divider network, such voltage values depending upon the connection of particular tip and ring conductors associated in discrete pairs to specific resistance terminals of the voltage-divider network. It is with the aid of such respectively different values of signaling voltage, or distinctively electrical quantities, that the individual pairs 01 through 101 arbitrarily, identified and tagged at the cable end 11 in FIG. 1 in the manner previously explained, may be identified at the cable end 19 in a manner which will now be explained.

The technician has now proceeded to the receiving cable end 19 which as aforementioned may lie at a distance varying in magnitude from the order of several hundred feet to several miles from cable end 11 and undertakes thereat the procedure for identifying the last-mentioned conductor pairs. At the receiving cable end 19, the technician as an initial step sets out to calibrate the receiving equipment after it has been set up in the system illustrated in FIG. 1. Referring now to FIG. 1, meter 40 will be understood to comprise basically a 1-milliampere full-scale deflection milliammeter functioning as an ohmmeter, with the digits 1 through 0 stamped on the meter face to correspond respectively with 0.1 through 1.0 milliampere, in 0.1-milliampere amounts of current flowing therein. Thus, it will be understood that a flow of 0.1 milliampere in the meter will actuate the meter pointer to number "1"; a flow of 1.0 milliampere will actuate the pointer to number "0"; and the steps of 0.1 milliampere from 0.2 through 0.9 milliampere will actuate the pointer successively in individual steps from number "2" through number "9," respectively.

As pointed out previously, meter 40 is connected in the series circuit including 4.5-volt source 38, resistor 39, potentiometer 43, and output resistor 32. At this point in the testing procedure, the probe in FIG. 1 is grounded by connection to ground 27 which is effectively the grounded lead sheath of cable 10 as previously pointed out thereby establishing amplifier 25 with a "no signal input" condition. Now, potentiometer 43 is adjusted until the pointer indicates a "0" reading on the meter. Since this reading constitutes a full-scale meter deflection, it follows that an approximately 1-milliampere amount of current will be caused to flow through the meter from the 4.5-volt source 38 for the reason previously mentioned. This means that an approximately minimum amount of current will flow in the collector circuit of transistor 31 and thereby in resistor 32 from the 9.0-volt source 76, and some current will flow in the latter resistor from source 38. In regard to the current flow in the collector circuit, the current of source 76 in FIG. 3 will divide at junction 77 of voltage divider 70, 71 and 72, so that part of the current flows in a first path including resistor 72, emitter circuit and transistor 31 into the collector circuit thereof, and the remaining part of the current flows in a second path including resistor 71, common point 70*a*, resistor 67, base circuit and the transistor 31 into the collector circuit. Since resistor 70 has a resistance value of 56,000 ohms as compared with the resistance values of 3900, 1200 and 510 ohms of resistors 67, 71 and 72, respectively, as above noted, it will be evident that little, if any, current will flow through resistor 70 into the collector circuit.

As the above-noted two currents from sources 38 and 76 will flow in output resistor 32 in the same direction, it will be seen that the upper terminal 32*a* of the resistor is positive and is connected to the positive terminal of source 38 as shown in FIGS. 1 and 3. As a consequence, the voltage developed across resistor 32 and due to the collector current flowing therein will buck the 4.5-volt voltage of source 38 whereupon the 1-milliampere current will be caused to flow from source 38 through meter 40 to establish the "0" reading thereon. This, as previously noted, is achieved with the aid of appropriate adjustments of potentiometer 43. Such bucking voltage will have a substantially minimum value for the purpose of this explanation. Thus, the meter 40 is now calibrated for the "no signal input" condition.

Next, the probe is caused to engage but not penetrate the insulation on the ring conductor of tracer pair 101 on which the maximum signaling voltage relative to ground has been established for the reason hereinabove mentioned. It will be further understood that the capacitance between the probe and metallic conductor with the insulation constituting a solid dielectric therebetween is so designed that such capacitance is large as compared with the smaller capacitance between the probe and respectively other conductors in proximity thereof but not involved in the identification test at the moment. For the purpose of achieving the large capacitance, the probe may be provided with such internal configuration that it clamps onto substantially the entire peripheral surface of the individual conductor insulation; or with a forked-type clamp whose opposing jaws engage substantially diametrically opposite portions of the conductor insulation; or with a plurality of separate openings for accommodating the peripheries of standard-gauge wires and accompanying insulation. It will be apparent that while it is desirable that the probe may be designed to compress the insulation slightly, it is important that the probe may include an appropriate stop for limiting the insulation compression whereby damage thereto is avoided. Such stop serves to avoid damage to the insulation in order to preclude subsequent deterioration of conductors due to the leakage of direct current under high-humidity conditions. While punctured areas of the conductor insulation may be treated with modern chemicals, it is possible that some conductor deterioration may eventually occur regardless of such treatment. In such instances, a defective conductor of the foregoing type may necessitate replacement, thereby a replacement expense and a loss of revenue while the cable is out of service.

As the next succeeding step, the probe is applied to the ring conductor of tracer pair 101 which is connected to "ring terminal 1" of the voltage-divider network as shown in FIGS. 1 and 2, which conductor has the maximum signaling voltage established therebetween and ground in the manner previously mentioned. The gain of amplifier 25 is then adjusted via potentiometer 25*a* connected in its cathode circuit as shown in FIG. 1. Such potentiometer will be understood to illustrate broadly one type of suitable gain or volume control of which any suitable type of similar control known to the art may satisfactorily serve the same purpose. The adjustment of the potentiometer is continued until the pointer on meter 40 is actuated to the "1" reading whereupon it will be recalled from the previous explanation that substantially a 0.1-milliampere amount of current is caused to flow through the meter 40 from source 38. The receiving equipment including amplifier 25 and meter 40 are now calibrated for "maximum signal input." Thus, the receiving end of FIG. 1 is calibrated for both the "no signal input" and "maximum signal input."

Referring to the last-mentioned calibration of amplifier 25 and meter 40 for "maximum signaling input," it will be seen in FIGS. 1 and 3 that the alternating-current output of the amplifier 25 is applied via transformer 50 to the base electrode 52 of transistor 29 which further amplifies the test signaling voltage. The voltage so amplied is passed via transformer 54 to rectifier 30 from which a maximum amount of rectified current is applied across base electrode 68 of transistor 31. This current serves to bias the base electrode of transistor 31 in the well-known manner to the maximum amount for the purpose of this explanation whereupon a maximum amount of current is caused to flow in the collector circuit of the transistor. This current increases proportionately to the maximum amount the magnitude of voltage developed across output resistor 32 whose positive terminal 32*a* is connected to the positive terminal of source 38 as above noted. The voltage due now to the collector current in output resistor 32 serves to buck the voltage of source 38 as above mentioned. As a consequence of the effect of the maximum amount of bucking voltage of resistor 32, a minimum value of current, or 0.1 milliampere, is caused to flow from source 38 through meter 40 to establish the "1" reading thereon. This bucking voltage established with the aid of appropriate adjustments of potentiometer 25*a* in amplifier 25 serves to calibrate the receiving end of the system shown in FIG. 1 for the "maximum signaling voltage" previously mentioned.

Referring again to FIG. 1, it will be seen that the pair 01 tagged arbitrarily via tagboard 12 at the sending cable end 11 may be identified at the receiving cable end 19, as follows: The probe is now attached to the tip of an unknown conductor and a "0" reading produced on meter 40. This is identical with the "0" reading obtained for the tip conductor of the 101 tracer pair and corresponds to a 1.0-milliampere flow of current in meter 40 from source 38, as previously explained. Since the tip conductor due to its non-color insulation will always be identified ahead of its associated color ring conductor, the last-mentioned "0" reading indicates the unknown pair lies in the 01 through 09 level, that is, it is one of the pairs lying between pairs 01 through 09. Next, the probe is attached to its associated ring conductor whereupon a "1" reading is produced on the meter. This is identical with the "1" reading produced for the ring conductor of the 101 tracer pair and corresponds to a 0.1-milliampere flow of current in meter 40 from source 38 for the reason previously explained. Thus, the unknown pair is properly identified as the "01" pair. The tracer pair 101 due to its distinctive color will be immediately distinguishable from the 01 pair.

The 25, 76 and 99 pairs projecting through the tagboard at the sending cable end 11 may be similarly identified in the following manner. The probe is attached to the tip conductor of an unknown pair whereupon a "2" reading produced on meter 40 corresponds to a 0.2-milliampere flow of current from source 38 therein. This fixes the pair in the 20 level, that is, a pair lying between the 21 through 29 pairs. Next, the probe is attached to its associated ring conductor whereupon a "5" reading produced on the meter corresponds to a 0.5-milliampere flow of current therein from source 38. The unknown pair is now identified as the "25" pair. Then, the probe is attached to the tip conductor of an unknown pair to obtain a "7" reading on the meter. This will correspond to a 0.7-milliampere flow of current in meter 40 from source 38. This sets the unknown pair in the 70 level, that is, lying between the 70 through 79 pairs. Next, the probe is affixed to its associated ring conductor to provide on the meter a "6" reading which corresponds to a 0.6-milliampere flow of current therein from source 38. The unknown pair is thereby identified as the "76" pair. Now, the probe is attached to the tip conductor of an unknown pair to provide a "9" reading on the meter, corresponding to a 0.9-milliampere flow of current therein from source 38, whereby the pair is classified in the 90 level, that is, lying between 90 through 99. Next, the probe is attached to its associated ring conductor to obtain on the meter a "9" reading which corresponds again to a 0.9-milliampere flow of current therein from source 38. The unknown pair is thereby identified as the "99" pair. Similarly, the probe may be attached to the tip and ring conductors of the respectively remaining pairs connected to the voltage-divider network from the tagboard as shown in FIG. 2 and properly identified by the testing procedure just explained. Thus, the first 101 pairs are now identified and tagged at the receiving cable end 19.

In connection with the foregoing identifications, it will be understood that the individual readings "2" through "9" produced on meter 40 will be due to "0.2" through "0.9," respectively, milliampere amounts of current flowing therein from source 38. This would mean that the discrete tip and ring conductors tested for a given reading of "2" through "9" would be connected to respectively corresponding terminals 2 through 9 of the voltage-divider network. Assuming, for example, the tip or ring conductors tested are connected to the voltage-divider terminals in the numerically ascending order from 2 through 9, then the amounts of rectified biasing current supplied to the base electrode 68 of transistor 31 would fall into the numerically descending order in regard to their relative magnitudes whereupon proportionately decreasing amounts of collector current would result in transistor 31, for reasons hereinbefore mentioned. Such decreasing amounts of collector current would provide proportionately decreasing amounts of voltage in resistor 32 for bucking the voltage of source 38 thereby providing the correspondingly numerically increasing amounts of current flowing in meter 40 in the 0.1-milliampere steps, from 0.2 through 0.9 milliampere. These would establish the discrete 2 through 9 readings on the meter.

It is obvious that the system of FIG. 1 as above explained is equally applicable for obtaining the identification of discrete twisted pairs of any "101 pair count" of the remaining pairs in the cable such, for example, as the 102 through 202 pairs by adding the number "101" to each of the pairs arbitrarily identified via the tagboard 12 in FIG. 1 as the 01 through 101 pairs; as the 203 through 303 pairs by adding the number "202" to the next succeeding 01 through 101 pair group; as the 304 through 404 pairs by adding the number "303" to the following 01 through 101 pair group; and so on. In each of the "101 pair groups," it will be understood that a tracer pair identical with tracer pair 101 and suitable for the foregoing testing procedure is included therein.

Figure 4:
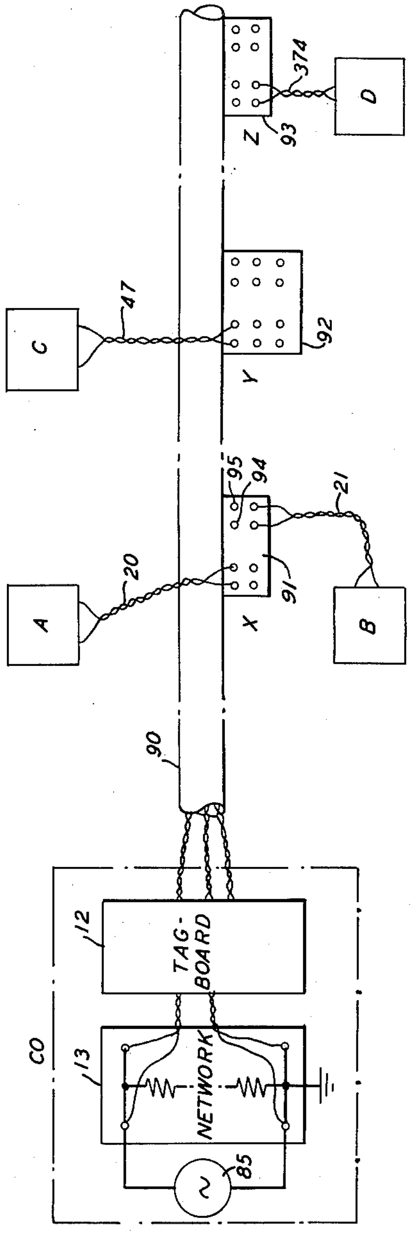
FIG. 4 is a modification of the embodiment of FIG. 1 showing the use of the invention in the area of a central office for expeditiously connecting a plurality of local telephone subscribers therewith.

FIG. 4 illustrates the manner in which the invention of FIGS. 1, 2 and 3 may be utilized to identify discrete cable pairs in a standard telephone cable 90 extending, for example, overhead on conventional telephone poles or underground via manholes between a telephone central office CO and a plurality of telephone subscribers located at differently spaced points along the cable. Assuming the tip and ring conductor pairs have been arbitrarily identified and permanently tagged at the central office according to the procedure hereinbefore explained, regarding FIGS. 1, 2 and 3, it is now desired to assign, for example, pairs 20 and 21 to subscribers A and B in local area X, pair 47 to a subscriber C in local area Y, and pair 374 to a subscriber in local area Z. For this purpose, it will be further assumed that terminal strips 91, 92 and 93 of conventionally telephone type are mounted overhead on telephone poles or in manholes located in the areas X, Y and Z, respectively. Obviously, each terminal strip will include a tip terminal 94 and a ring terminal 95 for connection thereto of the tip and ring conductors of the corresponding pair; and as many additional tip and ring terminal pairs as a particular residential neighborhood may require for present use and future growth.

It will be recalled from the previous description that each pair comprises a non-color tip conductor and a color ring conductor, and the identification is always commenced with the tip conductor ahead of its associated ring conductor. As an initial step, the receiving end including amplifier 25 and meter 40 are calibrated by use of the tracer pair 101, for example, at area X, in the manner hereinbefore described in connection with the identification of the conductor pairs shown in FIGS. 1 and 3. As a consequence, the probe is attached firstly to the tip conductor, and secondly to the ring conductor for producing the "2" and "0" readings, respectively, on meter 40. These readings, it will be recalled from the previous explanation, will correspond to the successive 0.2 and 1.0 amounts of current flow from source 38 through the meter 40 and thereby will serve to identify pair 20. Similarly, the pair 21 in area X may be identified. The identified conductors 20 and 21 may then be connected to terminal strip 91 and thereby be assigned to preselected subscribers A and B in area X, as indicated in FIG. 4.

In like manner, the pair 47 may be identified and connected to terminal strip 92 for assignment to subscriber C in area Y; and pair 374 may be identified and connected to the terminal strip 93 for assignment to subscriber C in area Z. In connection with each of areas Y and Z, it will be evident that the amplifier 25 and meter 40 will require new calibrations at each thereof due to their differences in distance from the central office and thereby the different amounts of effective resistance of the pairs at the respectively different distances. Once the discrete conductor pairs are properly identified at the central office and at the terminal strips 91, 92 and 93 in local areas X, Y and Z, respectively, the assignment of those pairs so identified to individual subscribers in local areas and then to correspondingly switching equipment at the central office follows well-known telephone technique. In area Y, tracer pair 101 may be used thereat for calibrating the receiving end equipment. In area Z, however, a tracer pair 404 identical with tracer pair 101 will be used. This tracer pair, it will be recalled from the previous explanation, may be numerically identified by adding "303" to the "1 through 101" pairs tagged in accordance with the foregoing procedure.

It is to be further understood that the above-described embodiments are merely illustrative of the application of the invention. Numerous other embodiments may occur to those skilled in the art without departing from the spirit and scope of the invention.

What is claimed is:

1. In a multiconductor cable having a plurality of discrete tip and ring conductor pairs twisted together throughout the length of the cable to constitute discrete pairs, each tip conductor having plain insulation and each ring conductor having a color insulation, the method of identifying discrete tip and ring conductor pairs at the opposite end of the cable, which consists of identifying discrete conductor pairs at one end of the cable with different multidigital numbers whose tens and units digits identify the tip and ring conductors respectively of the discrete pairs, simultaneously providing alternating-current voltages having distinctive magnitudes in the individual tip and ring conductors of said plurality of discrete pairs at the one cable end to represent the tens and units digits of the multidigital numbers identifying the tip and ring conductors, respectively, of the discrete pairs at the one cable end, probing the tip and ring conductors of the discrete pairs at the opposite cable end to derive therefrom alternating-current voltages having distinctive magnitudes comparable to the distinctive magnitudes of the alternating-current voltages provided in the corresponding tip and ring conductors of the discrete pairs at the one cable end, translating the derived alternating-current voltages into direct-current voltages having distinctive magnitudes corresponding to the distinctive magnitudes of the last-mentioned alternating-current voltages, and utilizing the translated direct-current voltages having the distinctive magnitudes to provide other voltages having distinctive magnitudes inversely related to the distinctive magnitudes of the last-mentioned translated direct-current voltages for indicating tens and units digits employed to form multidigital numbers designating the respective pairs at the opposite cable end in identity with the tens and units digits of the multidigital numbers assigned to the corresponding pairs at the one cable end.

2. In a system for identifying the tip and ring conductors of a plurality of discrete pairs at the opposite end of a multipair cable, each discrete pair having plain insulation to identify a tip conductor and a color insulation to identify a ring conductor and twisted together throughout the length of said cable, said system having at one cable end means to assign different multidigital numbers to said discrete pairs, a voltage divider network comprising a plurality of individual resistors connected in series, tip and ring terminals provided at the opposite ends of the respective resistors and arranged to constitute tip and ring terminal columns, each column having 10 terminals designated 1 through 0 commencing at corresponding ends thereof, each of said pairs having its tip conductor of the plain insulation connected to one of said tip terminals and its ring conductor of the color insulation connected to one of said ring terminals, and a generator of alternating-current voltage connected to the 1 and 0 terminals of said voltage divider network whereby said 1 through 0 tip and ring conductors are simultaneously provided with different magnitudes of the alternating-current voltage in such manner that the 1 tip and ring terminals receive the maximum voltage magnitude, the 0 tip and ring conductors receive ground voltage, and the 2 through 9 tip and ring terminals receive voltage magnitudes decreasing from the maximum to the ground voltage, said system having at the opposite cable end probing means engageable with the tip and ring conductors of the discrete pairs thereat to derive from the respective conductors of each pair alternating-current voltages having different magnitudes comparable to the different voltage magnitudes simultaneously provided in the corresponding tip and ring conductors of the discrete pairs at the one cable end, means to translate the alternating-curernt voltages derived by said probing means from the associated tip and ring conductors of the discrete pairs into direct-current voltages having different magnitudes corresponding to the different magnitudes of the derived alternating-current voltages, said last-mentioned means including a further resistor to develop said direct-current voltages of the different magnitudes thereacross, indicating means comprising a meter calibrated in a range including digits 1 through 0 and including a source of direct-current voltage of fixed magnitude, and circuit means for connecting said further resistor, meter, and source in series so that said source voltage is poled to oppose said direct-current voltages of different magnitudes developed across said further resistor for providing difference voltages having magnitudes inversely related to the last-mentioned direct-current voltage magnitudes and utilized to indicate said digits on said meter for establishing tens and units digits of multidigital numbers designating the respective pairs at the opposite cable end in identity with the tens and units digits of the multidigital numbers assigned to the corresponding pairs at the one cable end.

3. The system according to claim 2 in which said probing means includes a probe engageable with the external surface of the insulation on each of said tip and ring conductors of the respective pairs for deriving the alternating-current voltages therefrom, an amplifier to amplify the alternating-current voltages derived by said probe from said tip and ring conductors of the respective pairs, said amplifier having an input connected to said probe and also having an output connected to said translating means.

4. The system according to claim 3 in which said translating means includes a second amplifier to amplify the alternating-current voltages amplified by said first-mentioned amplifier, said second amplifier having an input connected to said output of said first-mentioned amplifier and also having an output, a rectifier for changing the alternating-current voltages amplified in said second amplifier into direct-curernt voltages, said rectifier having an input connected to said second amplifier output and also having an output, and a third amplifier for amplifying the last-mentioned direct-current voltages, said third amplifier having an input connected to said rectifier output and also having an output, said further resistor connected to said third amplifier output.

References Cited in the file of this patent

UNITED STATES PATENTS

| | | |
|---|---|---|
| 2,133,384 | Fisher | Oct. 18, 1938 |
| 2,212,290 | Fisher | Aug. 20, 1940 |
| 2,822,519 | Murphy | Feb. 4, 1958 |

FOREIGN PATENTS

| | | |
|---|---|---|
| 270,136 | Germany | July 18, 1913 |